Figure 1:
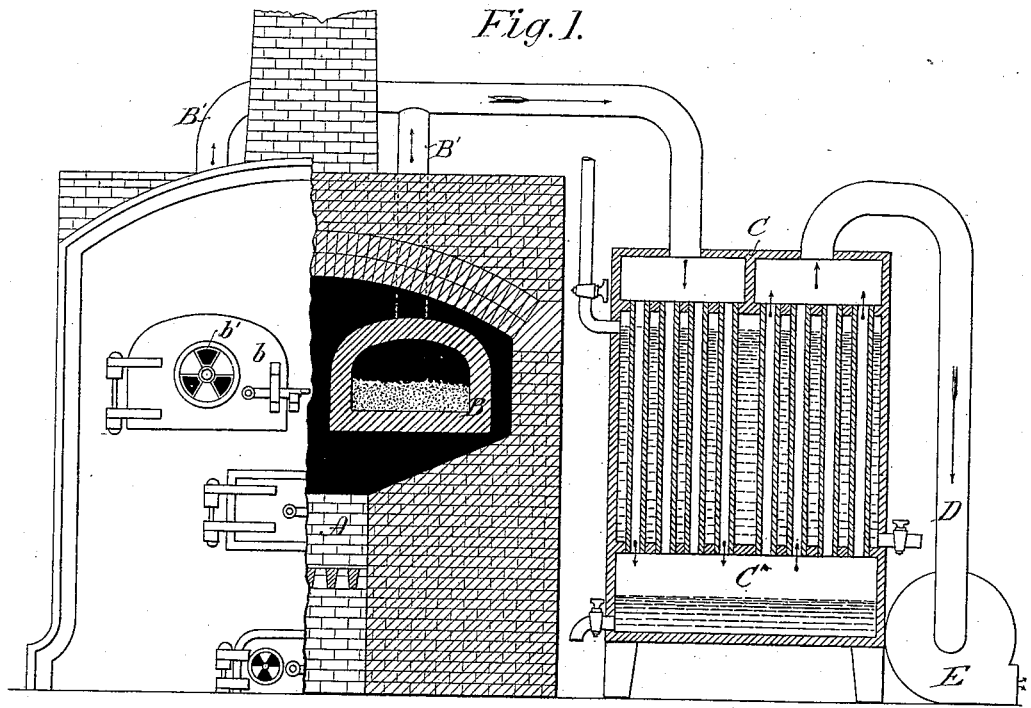

(No Model.)

R. N. R. PHELPS & W. A. CLARK, Jr.
PROCESS OF TREATING THE WASTE PICKLE LIQUOR OF IRON WORKS.

No. 267,582. Patented Nov. 14, 1882.

WITNESSES
Wm A. Skinkle
Ernest Abshagen

INVENTOR
Richard N. R. Phelps,
William A. Clark, Jr.
By their Attorneys
Baldwin, Hopkins & Peyton

UNITED STATES PATENT OFFICE.

RICHARD N. R. PHELPS AND WILLIAM A. CLARK, JR., OF TRENTON, NEW JERSEY, ASSIGNORS TO THE PHŒNIX CHEMICAL COMPANY, OF NEW JERSEY.

PROCESS OF TREATING THE WASTE PICKLE-LIQUOR OF IRON-WORKS.

SPECIFICATION forming part of Letters Patent No. 267,582, dated November 14, 1882.

Application filed March 28, 1882. (No model.)

*To all whom it may concern:*

Be it known that we, RICHARD NAFIS RHODES PHELPS, manufacturer, and WILLIAM ALEXANDER CLARK, Jr., M. D., both citizens of the United States, residing at Trenton, in the county of Mercer and State of New Jersey, jointly have invented a new and Improved Process of Treating the Waste Pickle-Liquor of Iron-Works, of which process the following is a specification.

In many iron and steel working processes—such, for instance, as the manufacture of wire, rods, bars, screws, plates, small castings, galvanized iron, &c.—the surface of the metal becomes coated with a scale consisting essentially of protoxide of iron. This coating is generally removed by dissolving it in a bath of dilute sulphuric acid. This acid in time becomes neutralized by the iron scale dissolved in it, forming a solution of a salt or sulphate of iron, technically known as "pickle-liquor." This pickle-liquor, which is produced in large quantities, is generally thrown away, polluting neighboring streams and destroying fish and vegetation. Various processes of utilizing this waste product have been suggested. One well-known method of treatment consists in charging a vessel containing the pickle-liquor with scrap-iron, to cause it to take up an increased proportion of iron, then running it into other vessels and allowing it to cool, so as to deposit crystals of sulphate of iron, the mother-liquor being returned to the vessels charged with scrap-iron and a fresh portion of the pickle-liquor mingled therewith to renew the process above described. The crystals thus formed are dried and exposed to heat, one method being to heat them in the open air, so as to obtain the ferric oxide; but in this case the sulphuric acid and other products of decomposition escape into the air and are lost. Another method of treatment consisted in heating the dried crystals in a closed retort and condensing the escaping vapors. This method recovered the sulphuric acid at the expense of the ferric oxide, which was very much deteriorated in quality, being of different colors in different portions of the calcining-vessel, and being hard, lumpy, and gritty, all of which qualities deteriorated its value as an article of commerce. The latter is the well-known German or Nordhausen process of producing fuming sulphuric acid, sulphate of iron being roasted in a series of small closed crucibles with narrow necks but with mouths opening into condensers ranged in galleries. These retorts were small size, holding at most three pounds of material, from which the vapors escaped as the calcination proceeded, the resulting product being a mixture of or cross between ferrous oxide and ferric oxide, possessing the undesirable qualities above referred to, while the escaping vapors were condensed to form the well-known Nordhausen fuming acid. So far as our knowledge extends, all other processes of recovering ferric oxide heretofore suggested or employed have been based upon chemical reaction or embodied it in some portion or some period of the process, thus involving the use of substances so expensive as to neutralize or destroy the commercial value of the product obtained.

The object of our invention is simultaneously to recover by one single operation the ferric oxide, sulphuric acid, and other products contained in waste pickle-liquor by its physical decomposition without the use of chemical agents or the admixture of foreign substance. This end we attain by evaporating the pickle-liquor, drying the resulting crystals of sulphate of iron in the usual well-known ways, and grinding them to fine powder, then exposing this sulphate to a high degree of heat of about an incipient redness, though we sometimes employ as high as a cherry-red heat—say 1,300° Fahrenheit—in a retort, vessel, or chamber, through which a regulated current of air passes. The heat decomposes the sulphate into sulphuric-acid vapor, sulphurous-acid gas, and the sesquioxide of iron. The first and second of these products pass into suitable receivers, tanks, or condensing-chambers, and the third is left on the floor of the heating chamber or retort.

Figure 2:
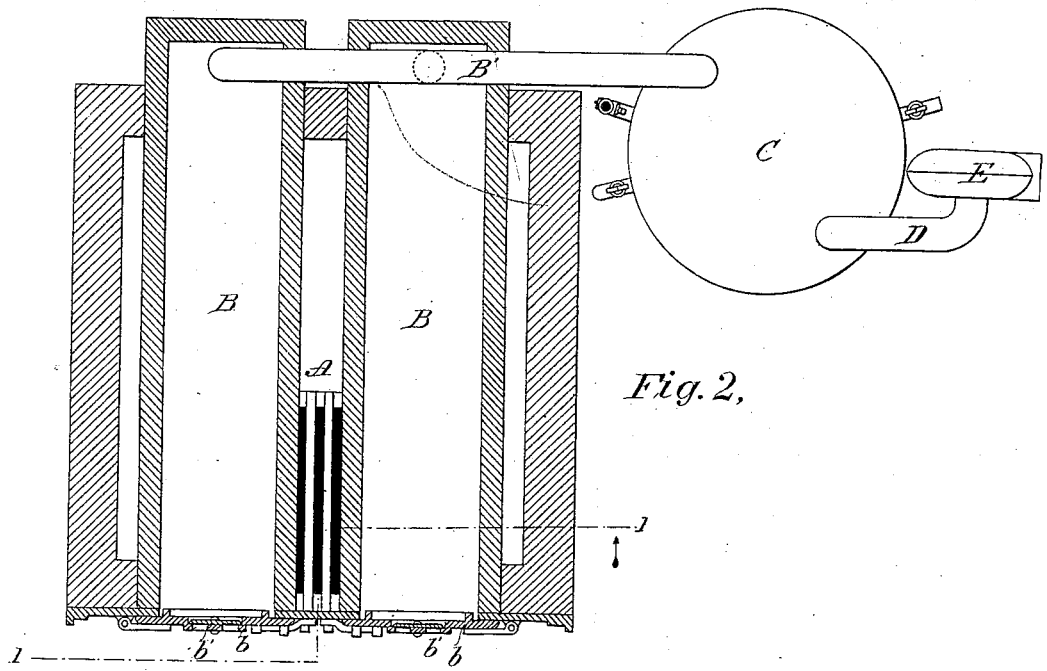

The accompanying drawings represent one convenient form of apparatus for carrying out the objects of our invention. The details of such apparatus, however, may be modified in various well-known ways without departing from the spirit of our invention, and the apparatus, being well-known, is not herein claimed.

e 1 represents a front elevation of the us, partly in vertical section on the of Fig. 2; and Fig. 2, a plan or top view ame, partly in section, on the line 2 2 1.

nace, A, is shown as provided with the ed-doors and draft-regulating devices. s of retorts or heating-chambers, B, ex- rough this furnace at each end, being d in front with charging-doors $b$ and gulating valves $b'$ and in rear with es- pes B', which terminate in a condenser, ny suitable well-known construction, n represented in the drawings being ll-known form of surface-condenser. A , leads from this condenser to a fan, E, r suitable draft-producing apparatus. rrying out the objects of our invention ce the dried pulverized sulphate of iron d from the waste pickle-liquor in the and heat it to a temperature of not less ,000° Fahrenheit. The retort of course s its contents from contact with the pro- f combustion in the furnace. Air, being ed to the retort in regulated quantities, to convert the protoxide of iron into a oxide, while the sulphuric-acid vapors lphurous-acid gas evolved are carried draft out of the retort into the condenser, ion of the products thus carried over be- ndensed into liquid sulphuric acid, which s in the reservoir C' at the bottom there- may be conducted by pipes to any suit- eceptacle. The escaping sulphurous- acid gas drawn off through the fan may be con- ducted to other receptacles or condensing- chambers and treated in well-known ways to recover the sulphurous acid. The residuum remaining in the retort, as above remarked, is a sesquioxide of iron, constituting a rouge or pigment of a rich red color, valuable for many purposes in the arts. The color of this ferric oxide or rouge varies according to the temper- ature of the retort and the length of time the process lasts, as is well known. We have given the best conditions attained in practice, but do not limit ourselves to the precise tem- peratures stated.

We claim as our invention—

The hereinbefore-described process of treat- ing pickle-liquor from the cleaning-tubs of iron- works, which process consists in evaporating the pickle-liquor, drying and pulverizing the resulting crystals of sulphate of iron, heating them to a temperature varying between an in- cipient and a cherry red in a retort or other chamber, into which air is admitted in regu- lated quantities, and condensing the escaping vapors, whereby ferric oxide and sulphuric and sulphurous acid gases are simultaneously re- covered by a single continuous operation.

In testimony whereof we have hereunto sub- scribed our names this 25th day of March, 1882.

RICHARD NAFIS RHODES PHELPS.
WILLIAM ALEXANDER CLARK, Jr.

Witnesses:
B. M. Phillips,
C. H. Hall.